United States Patent [19]
Inoue et al.

[11] Patent Number: 5,195,079
[45] Date of Patent: Mar. 16, 1993

[54] DISK DRIVER IN WHICH THE DISK HOLDER IS LOCATED BELOW A SLIDER

[75] Inventors: Kazuhiko Inoue, Houya; Takashi Watanabe, Ichikawa; Yoshio Hirose, Urawa, all of Japan

[73] Assignee: TEAC Corporation, Japan

[21] Appl. No.: 717,019

[22] Filed: Jun. 18, 1991

[30] Foreign Application Priority Data

Aug. 20, 1990 [JP] Japan .................. 2-218489
Sep. 10, 1990 [JP] Japan .................. 2-239445
Nov. 26, 1990 [JP] Japan .................. 2-321628

[51] Int. Cl.⁵ ............................. G11B 17/032
[52] U.S. Cl. ............................. 369/77.2; 369/75.1; 360/99.02; 360/99.06
[58] Field of Search ............ 369/75.1, 75.2, 77.1, 369/77.2; 360/99.02, 99.03, 99.06, 99.07, 99.05

[56] References Cited

U.S. PATENT DOCUMENTS

| | | | |
|---|---|---|---|
| 4,701,901 | 10/1987 | Imai | 369/75.2 |
| 4,779,257 | 10/1988 | Matsumoto | 369/75.2 |
| 4,785,365 | 11/1988 | Ohkita | 369/77.2 X |
| 4,815,065 | 3/1989 | Rouws | 369/75.2 X |
| 4,829,501 | 5/1989 | Seto et al. | 369/75.2 |
| 4,833,553 | 5/1989 | Noda et al. | 360/99.06 |
| 4,866,693 | 9/1989 | Odawara et al. | 369/77.2 X |
| 4,890,276 | 12/1989 | Ono et al. | 369/77.2 |

FOREIGN PATENT DOCUMENTS 78106848 12/1978 Taiwan .

*Primary Examiner*—Stuart S. Levy
*Assistant Examiner*—Joseph A. Rhoa
*Attorney, Agent, or Firm*—Andrus, Sceales, Starke & Sawall

[57] ABSTRACT

A disk driver in which a disk is inserted has a head (12), a holder (5), and a slider (14). The holder ascends and descends between a first position and a second position. The head ascends and descends between a third position and a fourth position in response to the ascending and descending of the holder. The disk (3) is inserted into or ejected from the holder (5) at the first position when the head (12) is at the third position, and information is recorded on or reproduced therefrom by the head at the fourth position when the holder is at the second position. Since the third position is higher than the first position so that the head does not hit the inserted disk, there is a space between the first and third positions. Accordingly, the slider (14) is located in the space so that it can avoid hitting the head, and thus the disk driver can be made thin.

19 Claims, 13 Drawing Sheets

PRIOR ART
FIG.IC
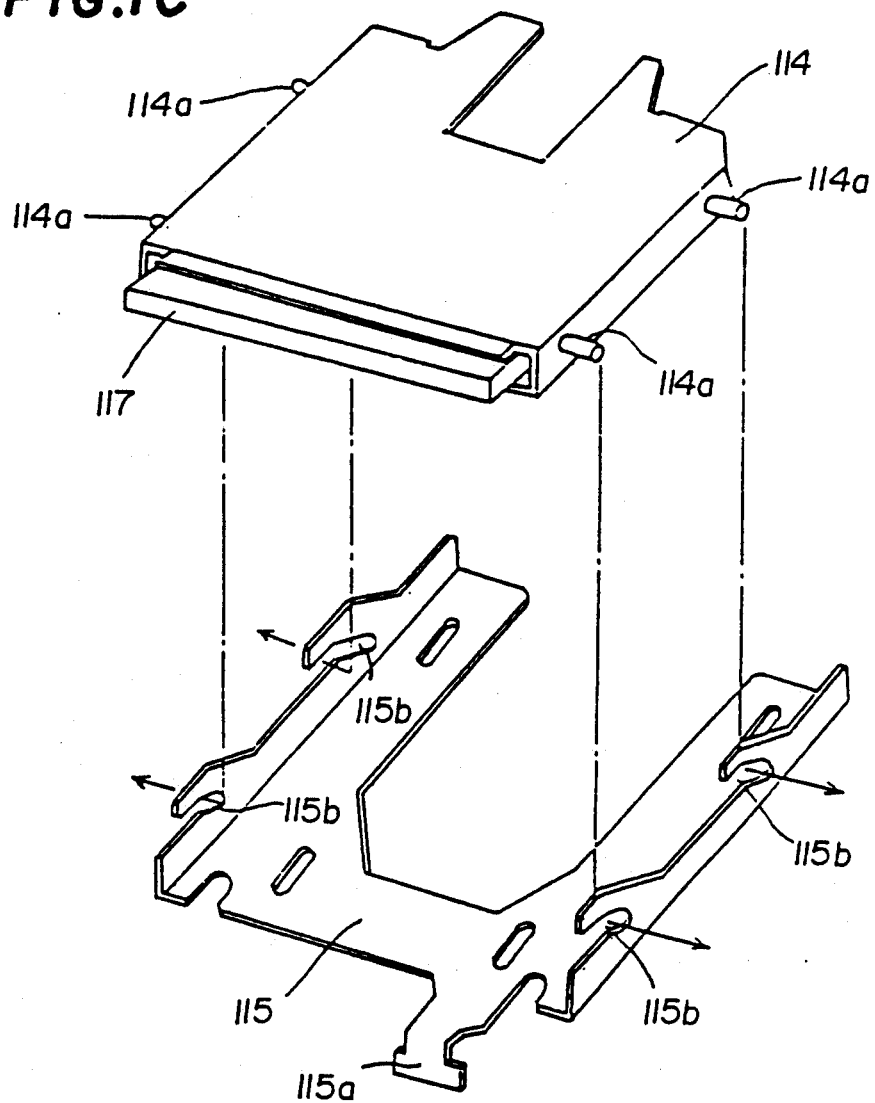
PRIOR ART
FIG.ID
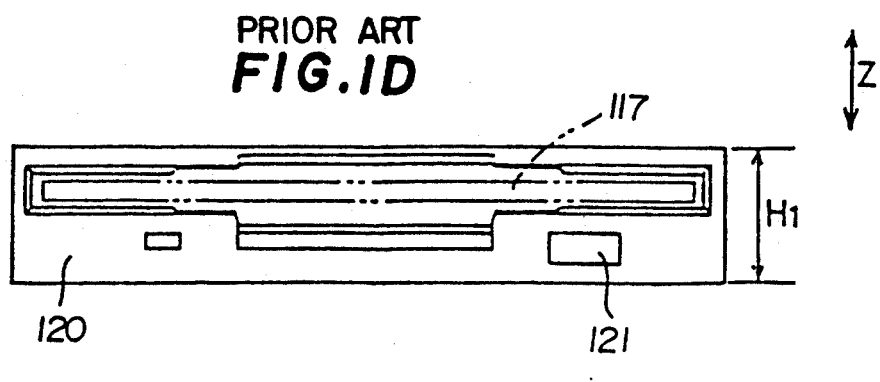

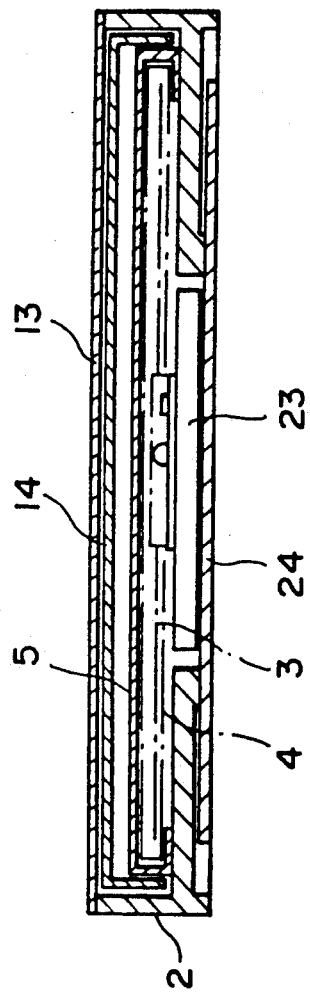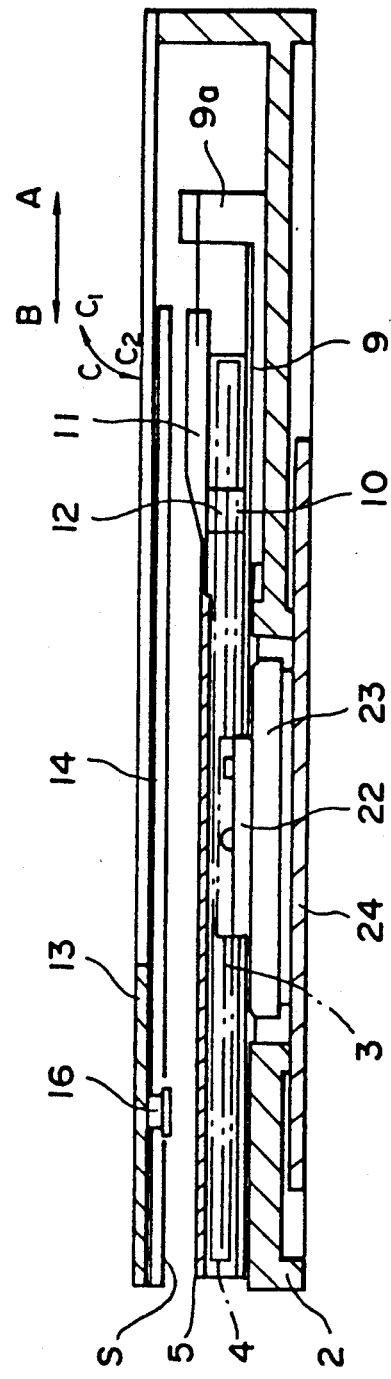

DISK DRIVER IN WHICH THE DISK HOLDER IS LOCATED BELOW A SLIDER

BACKGROUND OF THE INVENTION

The present invention relates to disk drivers, and more particularly to a disk driver in which a disk is inserted from the outside.

A disk driver, such as a so-called floppy disk, in which a disk is inserted to be driven, generally is equipped with mechanisms for loading the disk therein and ejecting it therefrom.

In a conventional floppy disk driver, the disk is inserted and loaded in a holder 114 shown in FIG. 1A and FIG. 1B. The term "a holder", as used herein, means a member for holding a disk and moving it from a position where the disk is inserted/ejected to a position where information is recorded on and/or reproduced from the disk. The holder 114 having no disk therein stays at a first position 101 in FIG. 1A apart from a rotary table (not shown) and a head 113. The rotary table rotates the disk for recording and/or reproducing. On the other hand, the holder 114 having a disk 117 therein moves to a second position 102 in FIG. 1B, and then is held there to load the disk 117 by a holding member. Information is recorded on the disk 117 and/or reproduced therefrom at the second position 102. When the disk 117 is being ejected, a slider 115 located between the holder 114 and the frame 116 releases the holder 114 from being held by the holding member. The term "a slider", as used herein, means a member for sliding along the X-axis in FIG. 1A and FIG. 1B in cooperation with a pushed eject button (not shown) to release the holder 114 from being held by the holding member by means of mechanical operations, and additionally the slider moves the holder 114 between the first position 101 and the second position 102. The slider is generally equipped with means for ejecting the disk from the holder. When the disk 117 is inserted into the holder 114 at the first position 101, a head 112 attached to an arm 111 stays at a third position 103 where it does not hit the disk 117. After the disk 117 has been inserted into the holder 114, as shown in FIG. 1B, the holder 114 descends to be held at a second position 102. Accordingly the arm 111 is connected to the holder 114 and thus move with it, so that, the head 112 moves from the third position 103 to a fourth position 104 where it can record information on the disk 117 and/or reproduce it therefrom. The head 113 has already been located at a position where it can record information on and/or reproduce information from the disk 117 in the holder 114 at the second position 102. When ejecting the disk 117, the slider 115 beneath the holder 114 slides along the X-axis in cooperation with a pushed eject button to release the holder 114 from being held. Since the slider 115 is engaged with guide pins 118 mounted on the frame 116, it can slide along the X-axis. Consequently, the holder 114 moves to the first position 101 so as to eject the disk 117 therefrom. Thus, while the disk 117 is inserted/loaded and ejected, the holder 114 moves accordingly from the first position 101 to the second position 102. And the head 112 also moves from the third position 103 to the fourth position 104. The holder 114 and the heads 112 and 113 are provided on the frame 116.

Incidentally, FIGS. 1C and 1D show a conventional relationship between the front panel 120 and an eject button 121. The slider 115 comprises an attachment portion 115a at a front end to which the eject button 121 is attached. The eject button 121 is located beneath the holder 114, and it is impossible to further miniaturize the attachment portion 115a and the eject button 121 from the stand point of being able to manipulate this button. The slider 115 further comprises inclined grooves 115b which are engaged with pins 114a projecting from the holder 114.

It is required that disk drivers themselves be made smaller and thinner due to the recent miniaturization of disks. Accordingly, the above magnetic disk driver has a space between a top surface of the holder 114 at the first position 101 and the top surface of the head 112 at the third position 103. A part of the space is indispensable for preventing the head 112 from hitting the inserted disk 117, however most of the space is not used so that the magnetic disk driver cannot be made thinner. Besides, it is not suitable to make the slider 115 thinner or to make the height of the guide pin 118 smaller from the standpoint of design strength. That is, the slider is formed by punching and/or bending a wide plate of steel. Therefore, if making the thickness of the slider is made thinner, the slider becomes deformable and the inclined grooves 115b are moved so that the holder 114 cannot stably move between the first and second positions. Moreover, it is impossible to make the front panel 120 thinner along the Z-axis because of the arrangement of the attachment portion 115a and the eject button 121.

SUMMARY OF THE INVENTION

Accordingly, it is a general object of the present invention to provide a novel and useful disk driver in which the problems described above are eliminated.

Another object of the present invention is to provide a thinner disk driver having a predetermined working strength and operational convenience, into which a disk is inserted and from which it is ejected.

The more specific object of the present invention is to provide a disk driver which comprises a frame, a holder into which a disk is inserted from a first direction and from which the disk is ejected in a second direction opposite to the first direction, the holder being located at a first position when the disk is inserted or ejected and being located at a second position when information is recorded on the disk and/or reproduced therefrom, and the holder being mounted on the frame movably between the first and second positions in a state where the disk is accommodated in the holder, a holding member, mounted on the frame, for holding the holder at the second position when the holder is moved to the second position, a head for recording the information on one side of the disk and/or reproducing the information therefrom, the head being located at a third position to avoid contact with the disk when the holder is located at the first position and being located at a fourth position where the head can record the information on the disk and/or reproduce the information therefrom when the holder is located at the second position, and the head being mounted on the frame movably between the third and fourth positions, a slider, located above the holder at the first position, which is engaged with the holder and engagable with the holding member, an ejector, engaged with the slider, which is manipulated when ejecting the disk in order to push the slider approximately parallel to the first direction, the slider sliding approximately parallel to the first direction to release the holder from being held by the holding member when the ejector is manipulated in a state where the holder is located at the second position, the slider moving the holder from the first position to the second position in response to the disk being inserted into the holder, and the slider moving the holder from the second position to the first position in response to the releasing of the holder from being held, and moving means for moving the head between the third and fourth positions.

Another more specific object of the present invention is to provide a magnetic disk driver which comprises a frame, a holder having an insertion entrance through which a disk is inserted therein from a first direction and from which the disk is ejected therefrom in a second direction opposite to the first direction, the holder being located at a first position when the disk is inserted or ejected and being located at a second position when information is recorded on the disk and/or reproduced therefrom, and the holder being mounted on the frame movably between the first and second positions in a state where the disk is accommodated in the holder, a holding member, mounted on the frame, for holding the holder at the second position when the holder is moved to the second position, a head for recording the information on one side of the disk and/or reproducing the information therefrom, the head being located at a third position to avoid contact with the disk when the holder is located at the first position and being located at a fourth position where the head can record the information on the disk and/or reproduce the information therefrom when the holder is located at the second position, and the head being mounted on the frame movably between the third and fourth positions, a slider engaged with the holder and engagable with the holding member, an ejector, engaged with the slider and located at an extension part thereof extending in a direction along a longest part of the insertion entrance of the holder so that the ejector and the holder are not piled in a same plane, which is manipulated when ejecting the disk in order to push the slider approximately parallel to the first direction, the slider sliding approximately parallel to the first direction to release the holder from being held by the holding member when the ejector is manipulated in a state where the holder is located at the second position, the slider moving the holder from the first position to the second position in response to the disk being inserted into the holder, and the slider moving the holder from the second position to the first position in response to the releasing of the holder from being held, and moving means for moving the head between the third and fourth positions.

A still more specific object of the present invention is to provide a magnetic disk driver which comprises a frame, a holder into which a disk is inserted from a first direction and from which the disk is ejected in a second direction opposite to the first direction, the holder being located at a first position when the disk is inserted or ejected and being located at a second position when information is recorded on the disk and/or reproduced therefrom, and the holder being mounted on the frame movably between the first and second positions in a state where the disk is accommodated in the holder, a holding member, mounted on the frame, for holding the holder at the second position when the holder is moved to the second position, a head for recording the information on one side of the disk and/or reproducing the information therefrom, the head being located at a third position to avoid contact with the disk when the holder is located at the first position and being located at a fourth position where the head can record the information on the disk and/or reproduce the information therefrom when the holder is located at the second position, and the head being mounted on the frame movably between the third and fourth positions, a slider, engaged with the holder and engagable with the holding member, which comprises at least more than two members coupled mechanically, an ejector, engaged with the slider, which is manipulated when ejecting the disk in order to push the slider approximately parallel to the first direction, the slider sliding approximately parallel to the first direction to release the holder from being held by the holding member when the ejector is manipulated in a state where the holder is located at the second position, the slider moving the holder from the first position to the second position in response to the disk being inserted into the holder, and the slider moving the holder from the second position to the first position in response to the releasing of the holder from being held, and moving means for moving the head between the third and fourth positions.

According to the first aspect of the present invention, a disk driver thinner than that of the conventional art and having a predetermined working strength and the operational convenience will be provided because the slider is located in the space which would not be used in the conventional disk driver. According to the second aspect of the present invention, since the ejector is located at the extension part of the insertion entrance of the holder, the disk driver is thinner than in the case where the ejector and the holder are piled in the same plane. According to the third aspect of the present invention, the slider comprises at least more than two members coupled mechanically so that the slider is deformed less and is further miniaturized than in the case where the slider comprises one plate member. Therefore, the slider stably releases the holder from being held and stably moves it between the first and second positions, and additionally, the disk driver is made thinner.

Other objects and further features of the present invention will be apparent from the following detailed description when read in conjunction with the accompanying drawings.

BRIEF DESCRIPTION OF THE DRAWINGS

FIG. 1A to FIG. 1D are views for explaining a conventional magnetic disk driver;

FIG. 8 and FIG. 9 are cross-sectional views of the disk driver having the disk loaded therein;

DESCRIPTION OF PREFERRED EMBODIMENT

Figure 1A:
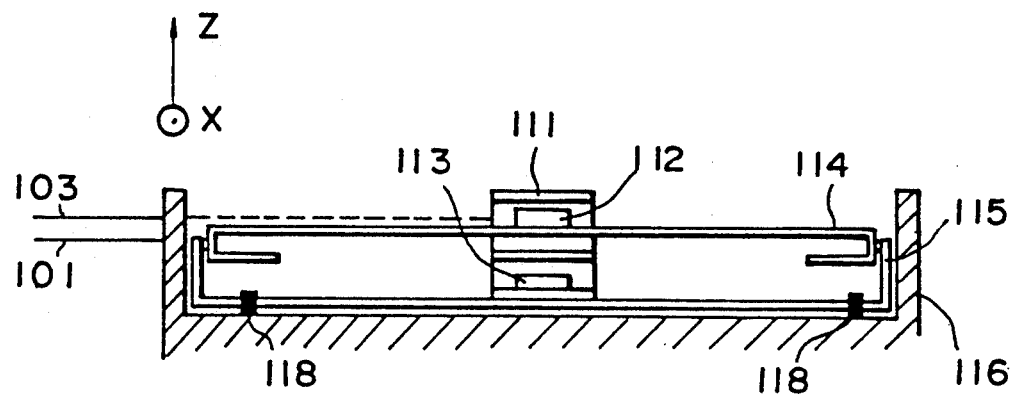
Figure 1B:
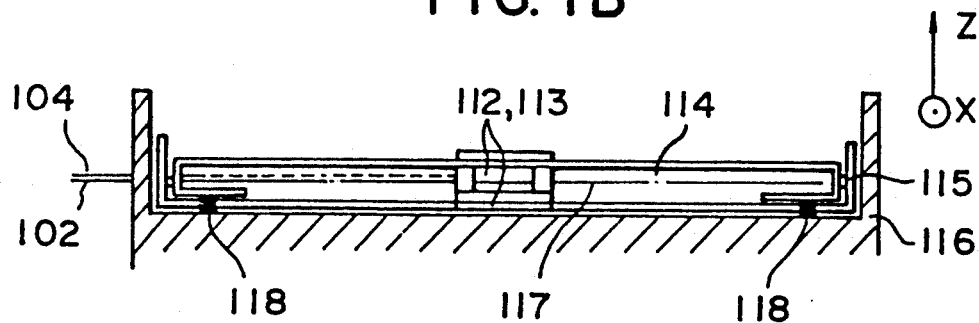

FIG. 2 through FIG. 11 show a first embodiment of a disk drive according to the present invention. A base 13 described later is omitted from FIG. 2.

Referring to each drawing, a magnetic disk driver 1 comprises a holder 5 mounted on a frame 2, into which a case 4 (indicated by the one dotted line in FIG. 2) having a magnetic disk 3 therein is inserted.

The holder 5 can ascend and descend according to whether the case 4 is being loaded and ejected, and includes a crown plate 5a having a groove 5b so that a magnetic head assembly 11, which includes a magnetic head 12 and a part of a head supporting member 9 supporting the head, can move through the holder 5 via the groove 5b. In addition, the holder further comprises an insertion entrance 5g shown in FIG. 4 through which the case 4 is inserted therein and/or ejected therefrom. A L-shaped shutter lever 6 pivotably mounted on the crown plate 5a opens a shutter (not shown) of the inserted case 4. The shutter lever 6 is forced clockwise (in a direction of closing the shutter) by a coil spring 7. Mounted at the top of the shutter lever 6 is a pin 6a which projects into the holder 5 via an arc-shaped hole 5c and engages with the shutter of the inserted case 4.

Figure 2:
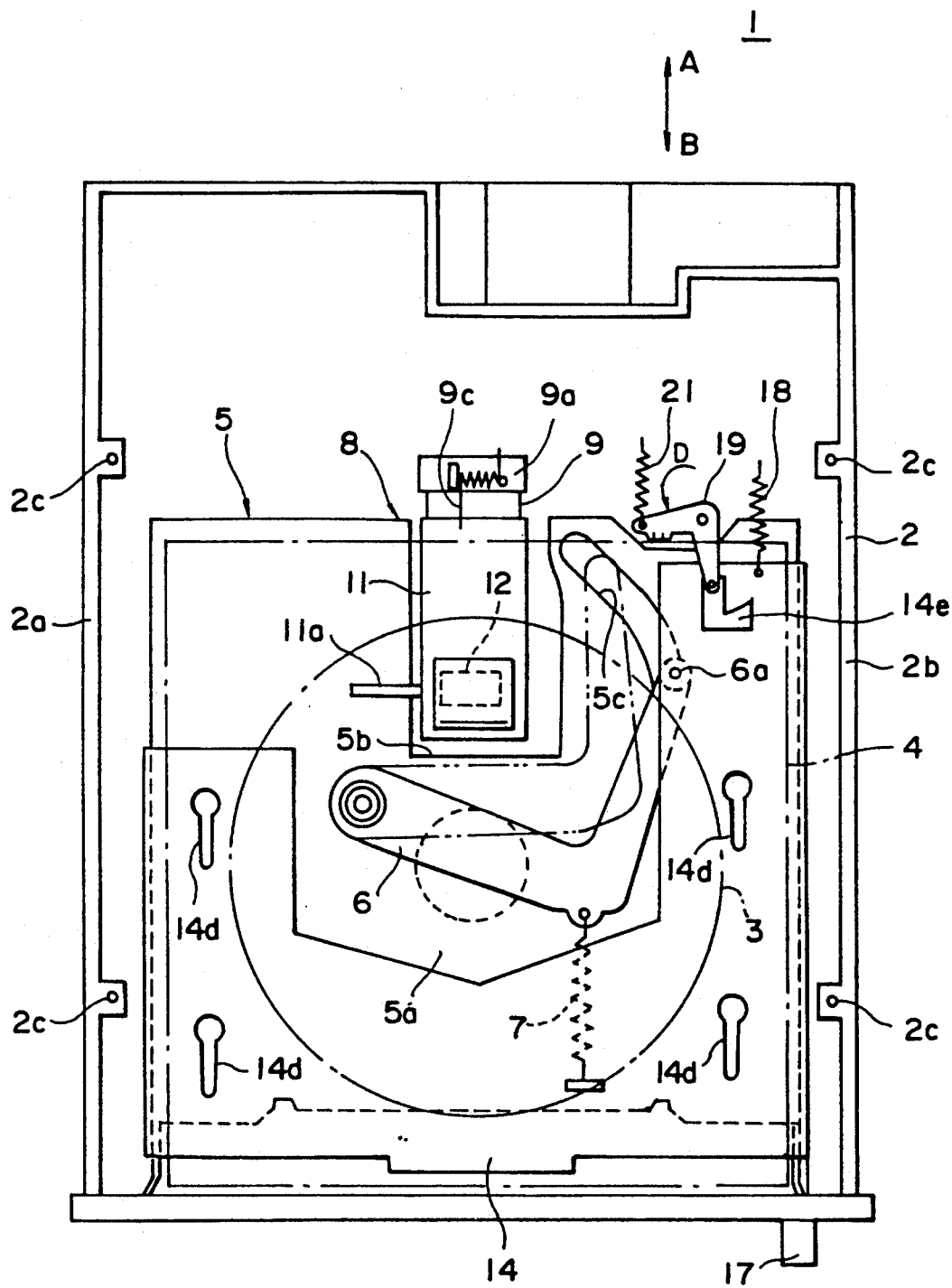
FIG. 2 is a plane view of first embodiment of a disk driver according to the present invention.
Figure 6:
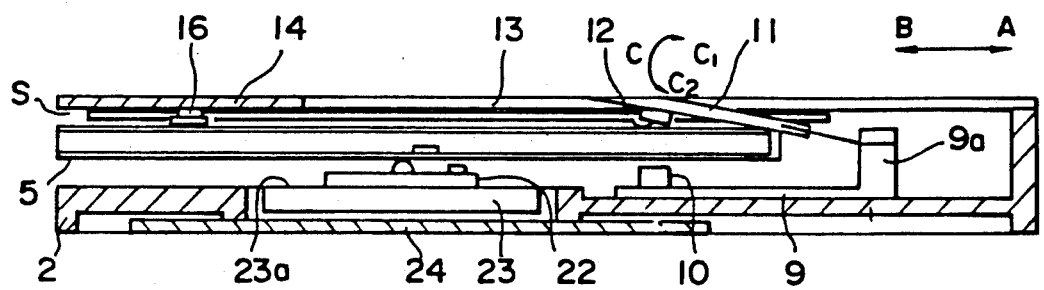

As shown in FIG. 2 and FIG. 6, the magnetic head assembly 8 includes a carriage 9, a lower magnetic head 10, an arm 11, and an upper magnetic head 12. The carriage 9 is mounted movably along the radial direction of the disk (direction AB). The lower magnetic head 10 is mounted at the top and upperside of the carriage 9. The arm 11 is supported movably in a direction C by an end 9a of the carriage 9. The upper magnetic head 12 is mounted at the top and underside of the arm 11. The carriage 9 is engaged with a lead screw (not shown) driven by a stepping motor (not shown) so that the carriage 9 moves in the direction AB on the frame 2 in accordance with the rotation of the lead screw to move the magnetic heads 10 and 12 respectively on preselected tracks on the magnetic disk 3.

The arm 11 is forced in the direction $C_2$ by the torsion spring 9c located at the end 9a of the carriage 9. The arm 11 is linked with the crown plate 5a of the holder 5 via a link 11a which extends from a side of the arm 11. Before inserting the case 4, the arm 11 is held at a position where the upper magnetic head 12 does not hit the inserted case 4.

Figure 3:
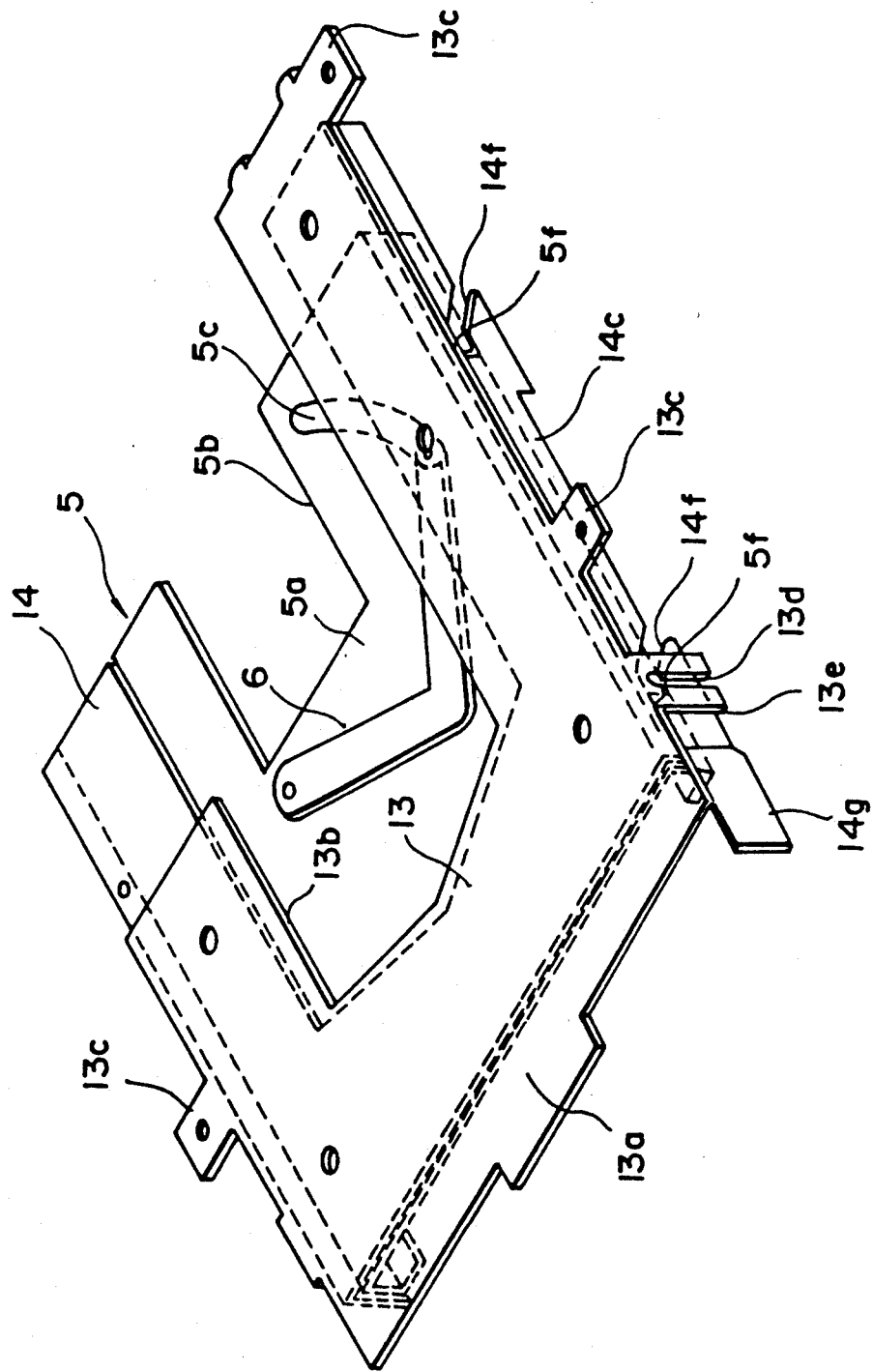
FIG. 3 is a perspective view showing an arrangement of a holder, a slider and a base.
Figure 4:
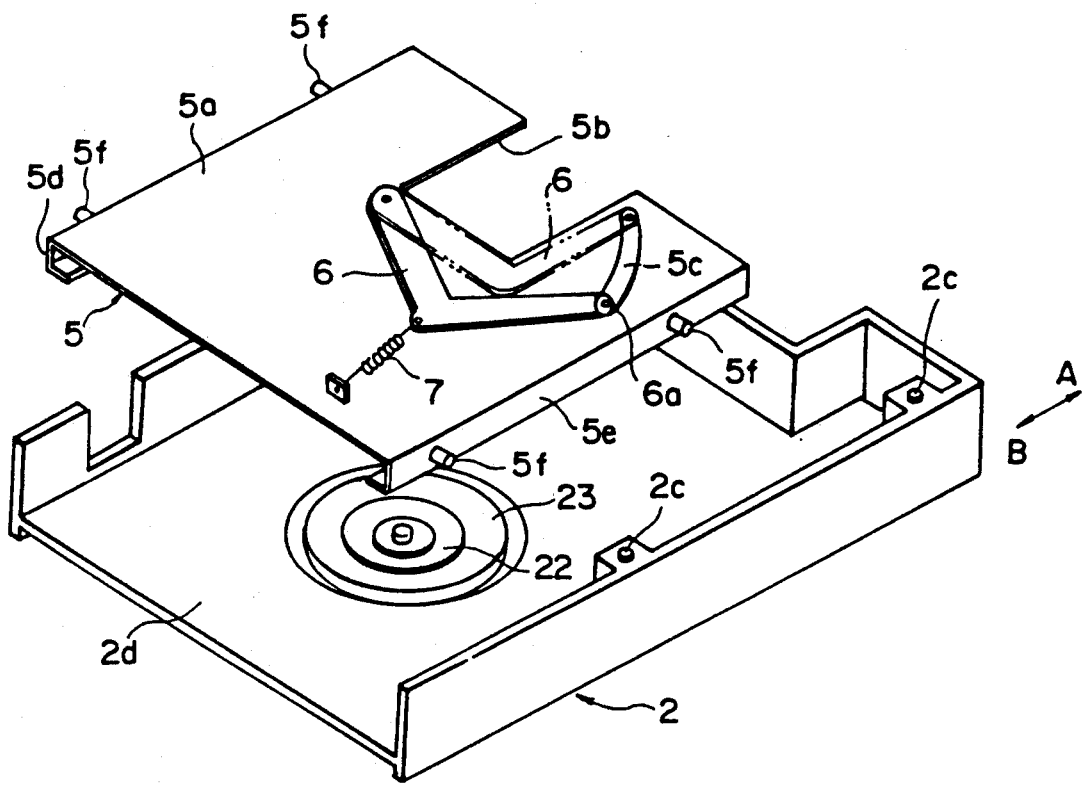
FIG. 4 is a perspective view showing a relationship between the holder and a frame.
Figure 7:
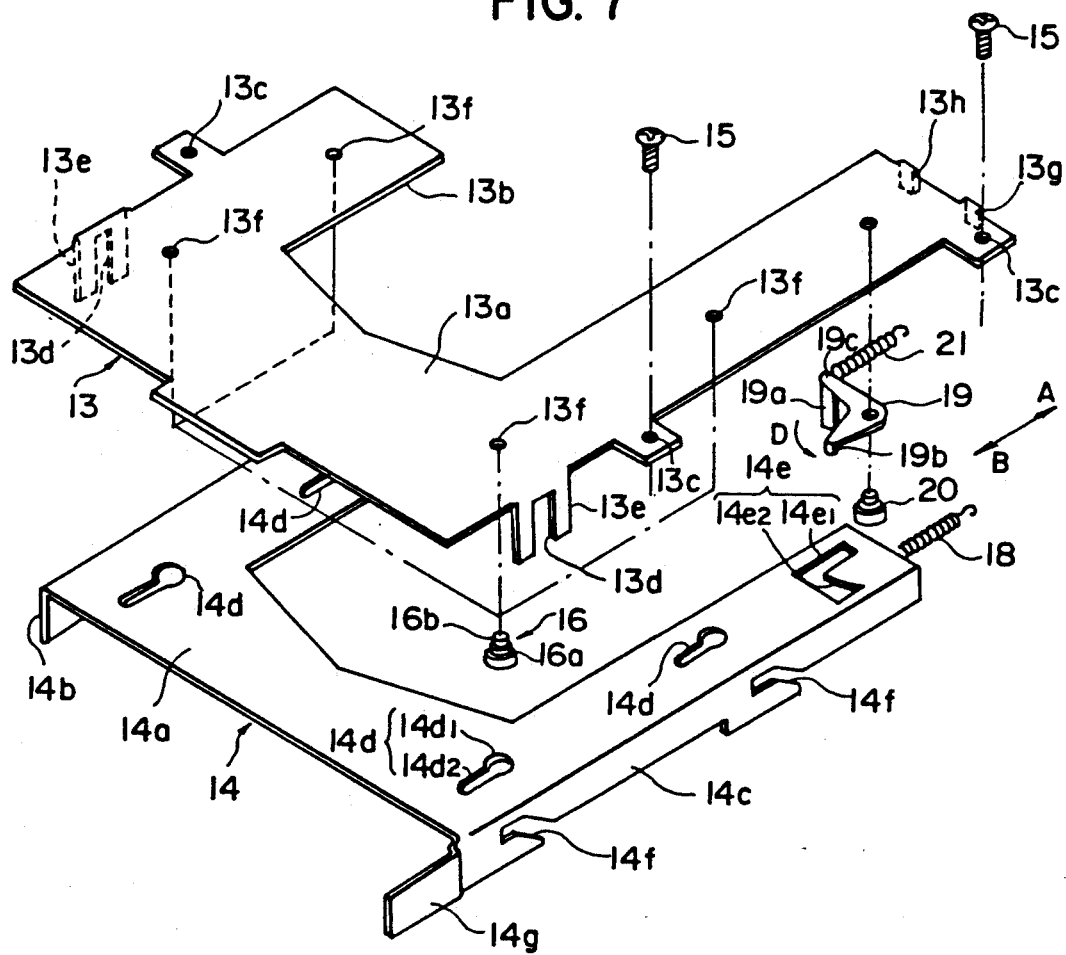
FIG. 7 is a perspective view showing a relationship between the base and the slider.

The base 13 is fixed, as shown in FIG. 2 and FIG. 7, to the frame 2 by screws 15, screw holes 2c and attachment parts 13c. The screw holes 2c are formed at the edges 2a and 2b of the frame 2. As shown in FIG. 3, the base 13 comprises a J-shaped plane part 13a, a groove 13b, the attachment parts 13c, and guide parts 13e. The groove 13b is formed to avoid contact with the shutter lever 6. The attachment parts 13c have screw holes in which screws 15 are inserted. The guide parts 13e have concave portions 13d which are engaged with pins 5f protruding from both sides 5d and 5e of the holder 5 so that the concave portions 13d guide the ascending and descending of the holder 5.

The slider 14 is located between the holder 5 and the base 13. The slider 14 comprises, as shown in FIG. 7, a crown plate 14a and side plates 14b and 14c. The U-shaped crown plate 14a is bent downward to form the side plates 14b and 14c. The slider 14 is pinned to the plane part 13a of the base 13 via four guide pins 16, slits 14d and pin holes 13f. The four slits 14d mounted on the crown plate 14a extend in the direction AB. The pin holes 13f are mounted on the plane part 13a of the base. Each slit 14d comprises a hole 14$d_1$ and a guide groove 14$d_2$. And each guide pin 16 comprises a large-diameter part 16a and a small-diameter part 16b. The large-diameter part 16a is engaged with the hole 14$d_1$, and the small-diameter part 16b is engaged with the guide groove 14$d_2$. The slider 14 is supported slidably in the direction AB via the guide pins 16.

The crown plate 14a has an L-shaped hole 14e at the end thereof. The hole 14e consists of a slit 14$e_1$ which extends in the direction AB and a slit 14$e_2$ which extends orthogonally to the slit 14$e_1$. The side plates 14b and 14c respectively have inclined grooves 14f in which the pins 5f are inserted. The crown plate 14a has an attachment portion 14g at the front end thereof to which an eject button 17 is attached.

Figure 10:
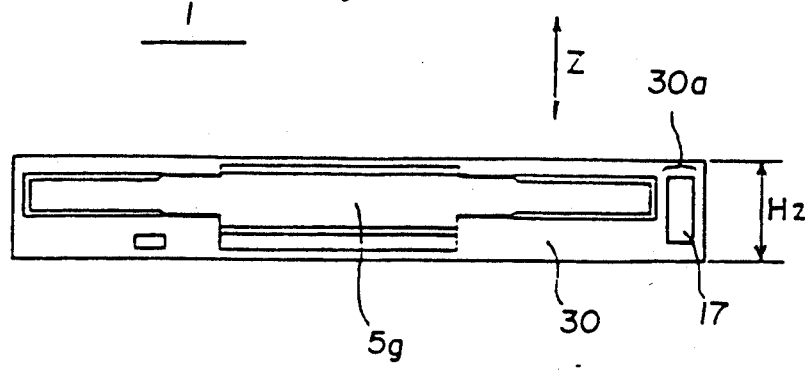
FIG. 10 and FIG. 11 are views showing a relationship between a front panel and an eject button.
Figure 11:
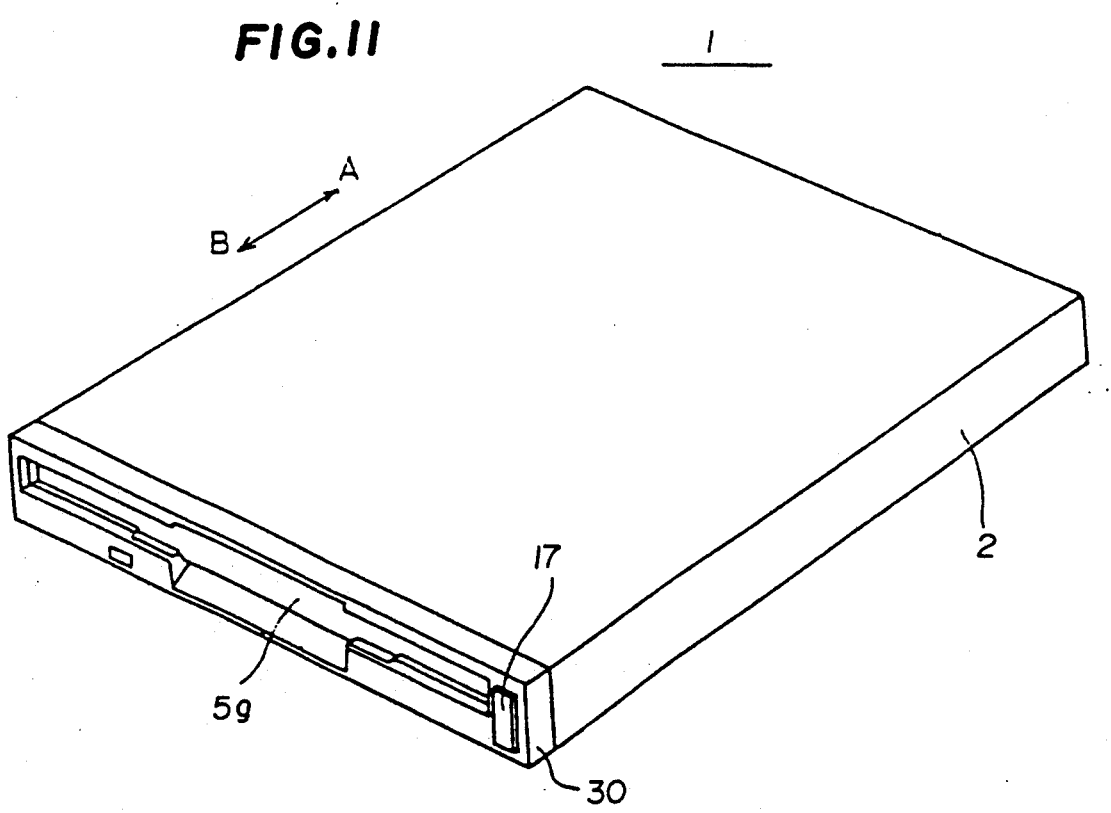
Figure 12:
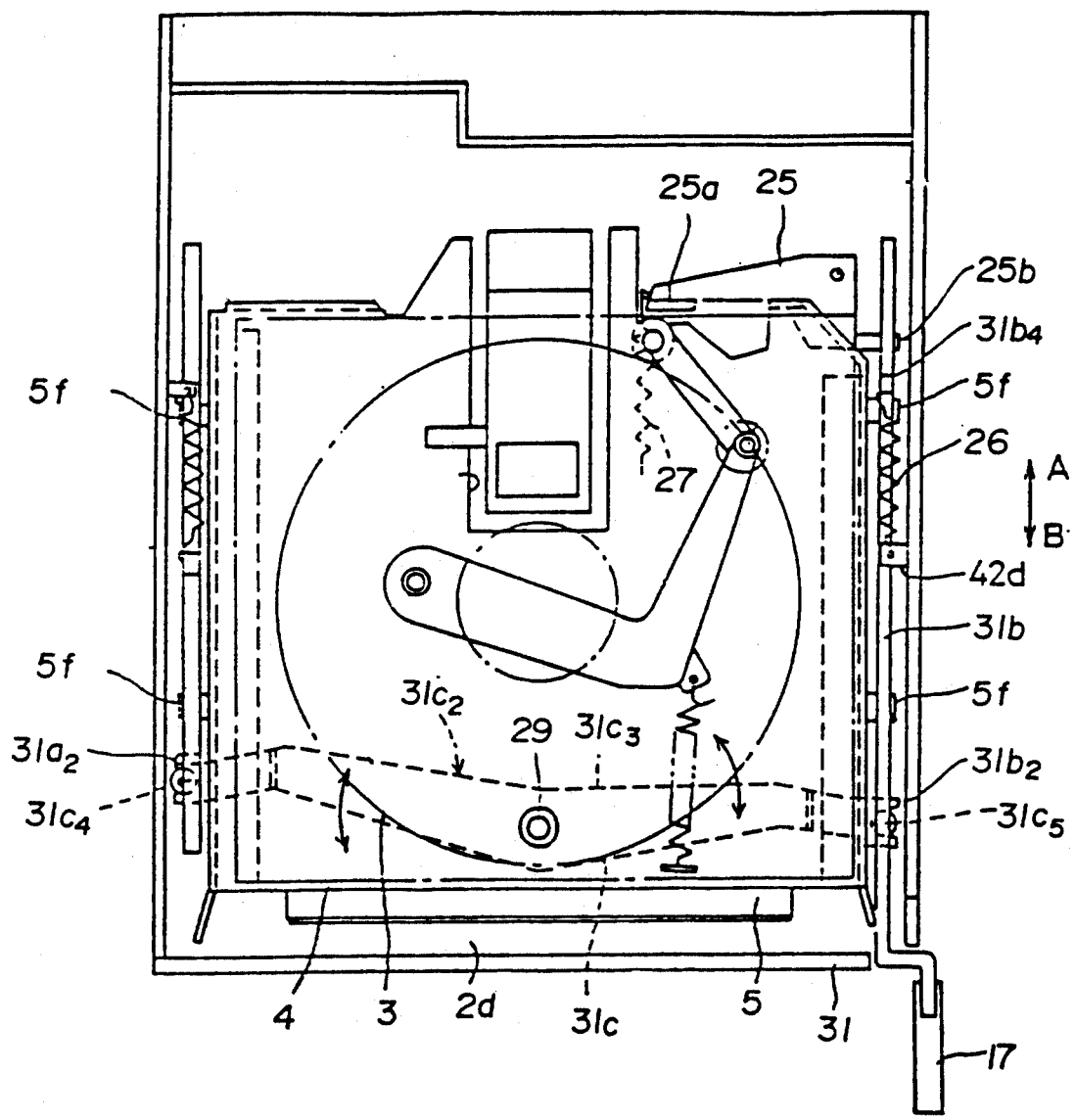
FIG. 12 is a plane view of a second embodiment of a disk driver according to the present invention.
Figure 13:
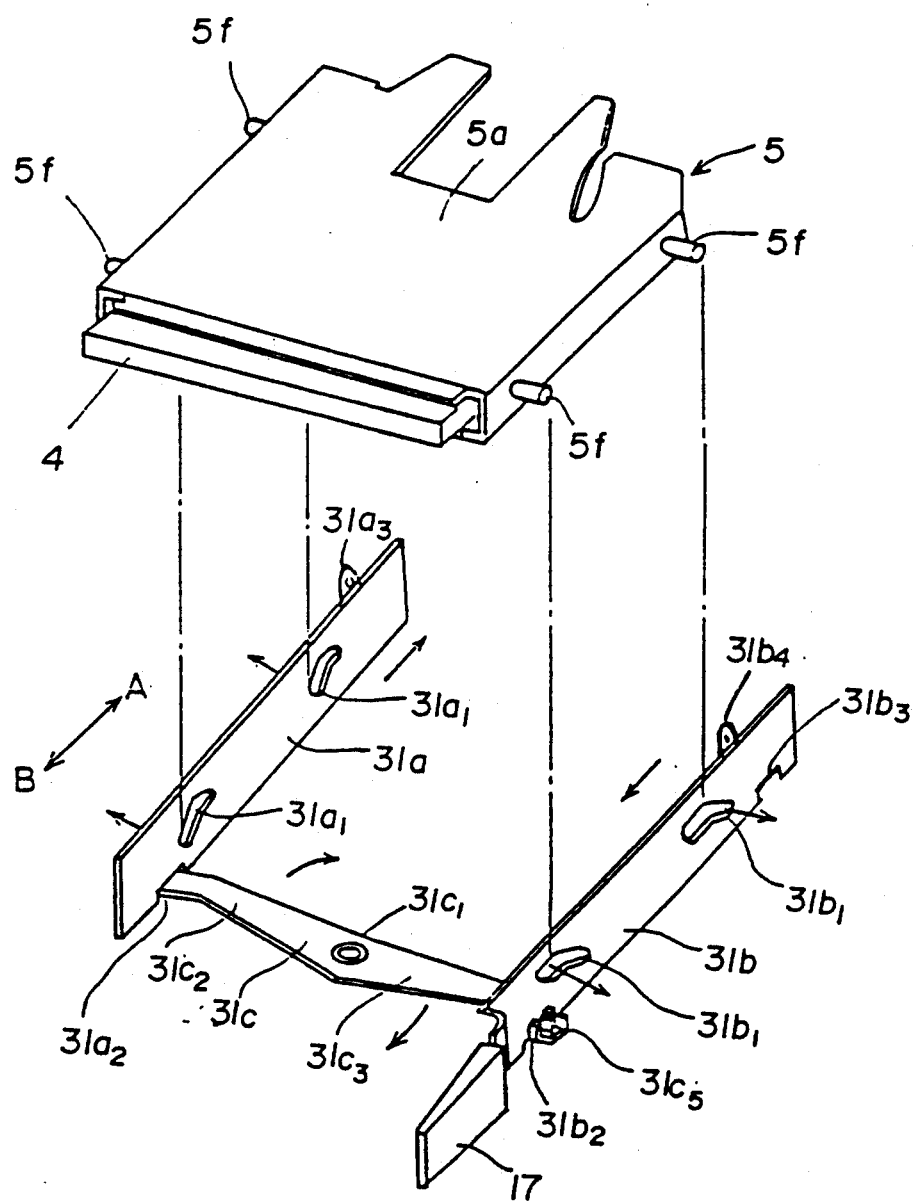
FIG. 13 is a perspective view showing an arrangement of the holder and the slider.
Figure 14:
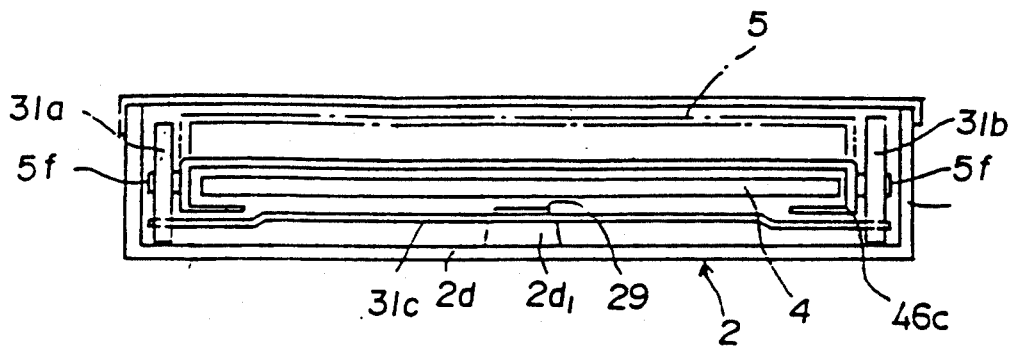
FIG. 14 is a cross-sectional views of the disk driver having the disk loaded therein.
Figure 15:
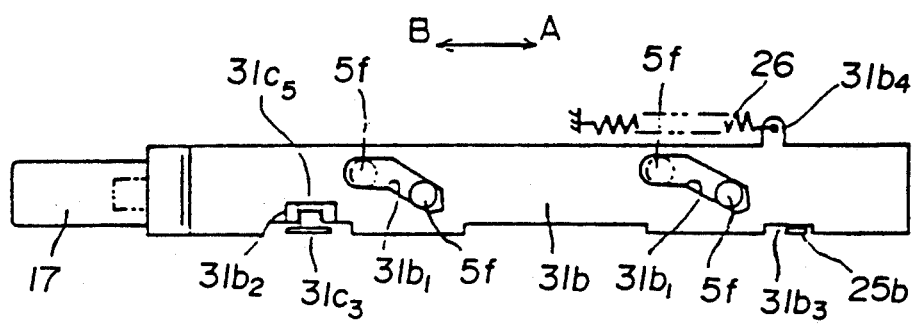
FIGS. 15 to 17 are views for explaining the construction of the slider.
Figure 16:
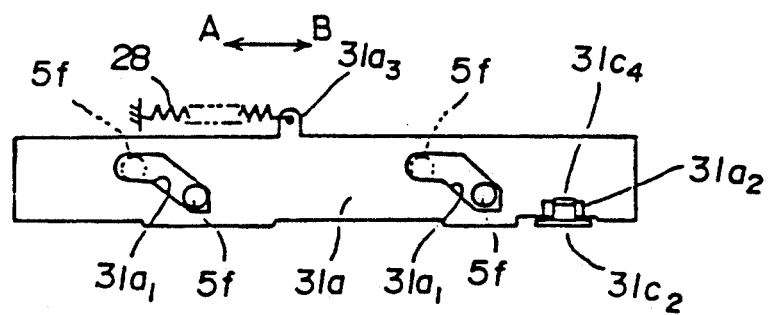
Figure 17:
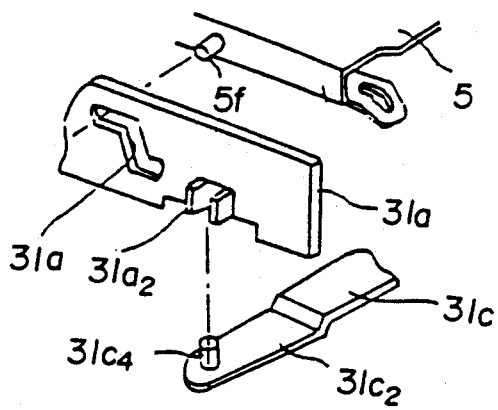

In the embodiment, as shown in FIGS. 3, 10 and 11, the attachment portion 14g and the eject button 17 are located at the extension part 30a extending in the direction along the longest part of the insertion entrance 5g of the holder 5 in the front panel 30. Therefore, the thickness $H_2$ along the Z-axis of the front panel 30 is thinner than the thickness $H_1$ of the conventional front panel 120 in FIG. 1D. The eject button 17 may be located at the left side of the insertion entrance 5g.

The slider 14 is forced in the direction B by a pressure spring 18. The pressure spring 18 is engaged, as shown in FIGS. 2 and 7, with the slider 14 at one end thereof, and is fixed with a tab 13g at one end of the base 13 at the other end thereof. The slider 14 is slid in the direction A in response to the eject button 17 being pushed.

As shown in FIG. 7, a latch lever or holding member 19 is supported pivotably around a pin 20 mounted on the base 13. The latch lever 19 comprises a protrusion 19a, a tab 19b and an engaging part 19c. The protrusion 19a touches the inserted case 4. The tab 19b is inserted into the hole 14e of the slider 14. The engaging part 19c is engaged with one end of a pressure spring 21. The other end of the pressure spring 21 is engaged with a tab 13h at an end of the base 13. Therefore the latch lever 19 is forced in a direction D by the pressure spring 21. As shown in FIG. 2, before pushing the eject button 17, the tab 19b is located in the slit 14$e_1$. However, when the eject button 17 is pushed so that the slider 14 slides in the direction A, the tab 19b touches an end of the slit 14$e_1$, and then the latch lever 19 rotates in the direction D. Accordingly, the tab 19b is engaged with the slit 14$e_2$ to hold the slider 14. The slider 14, the latch lever 19, and the pressure springs 18 and 21 may be assembled before they are attached to the disk driver 1. As a result of this, the disk driver itself can be assembled in a short time.

Figure 5:
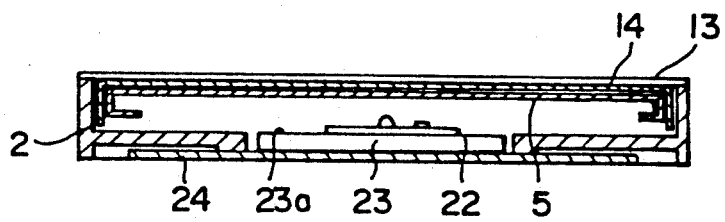
FIG. 5 and FIG. 6 are cross-sectional views of the disk driver having no disk.

As shown in FIG. 5 and FIG. 6, the holder 5 ascends to an insertion position before the case 4 is inserted therein. As mentioned above, since the arm 11 is linked with the holder 5 via the link 11a, the arm 11 also ascends with the holder 5. But the arm 11 is required to ascend to a position higher than that of the holder 5 to avoid contact with the inserted case 4. Therefore an aperture S is necessary between the holder 5 and the base 13 for the moving of the arm 11 to the higher position. Hereupon, only a small part of the aperture S is necessary to move the arm 11. According to the present invention, the slider 14 is located in most of the aperture S. Thus, the distance between the holder 5 and the frame 2 can be reduced so that the magnetic disk driver 1 can be made thinner.

The present invention enables the disk driver to be thinner than that of the conventional art without using a slider thinner than that of the same being used. Therefore the working strength of the slider 14 is never lessened, and a safe disk driver will be obtained. Also, the length of the guide pin 16 is never lessened so that the slider 14 can slide without coming off from the guide pins 16.

Before inserting the case 4, as shown in FIG. 5 and FIG. 6, the slider 14 is held at a position where the tab 19$b$ is engaged with the slit 14$e_2$. At that time, the arm 11 having the upper magnetic head 12 and the holder 5 has ascended, as mentioned above. When the case 4 is inserted into the holder 5, the front end of the case 4 touches the protrusion 19$a$ of the latch lever 19 to rotate clockwise. Accordingly the tab 19$b$ is moved from the slit 14$e_2$ to the slit 14$e_1$. Therefore the slider 14 is released from being held by the latch lever 19, and is slid in the direction B by the pressure spring 18. Because of the four guide pins 16, the slider 14 slides stably in the direction B. Since the pins 5$f$ are engaged with the inclined grooves 14$f$ of the side plates 14$b$ and 14$c$, the pins 5$f$ slide along the inclined grooves 14$f$ as the slider 14 slides in the direction B. Accordingly, the holder 5 descends to a position where the disk 3 can be engaged with a rotary table 22, as shown in FIG. 8 and FIG. 9. The arm 11 descends in synchronization with the descending of the holder 5 via the link 11$a$. In the course of loading the case 4 in the holder 5, the shutter (not shown) closing an entrance is opened by the pins 16$a$ of the lever 16 so that the heads 10 and 12 can be engaged with tracks on the disk 3 via the opened entrance. The magnetic disk 3 is rotated by the rotary table 22 driven by a motor 23. The motor 23 is mounted on the base plate 24 attached to the bottom surface of the frame 2. The rotary table 22 is mounted on the rotor 23$a$. After loading the disk 3, the heads 10 and 12 record information on the disk 3 and/or reproduce it therefrom.

When ejecting the case 4, the eject button 17 is pushed in the direction A. Thus the slider 14 slides in the direction A so that the holder 5 ascends. When the slider 14 is moved in the direction A, the latch lever 19 is rotated in the direction D by the pressure spring 21, and the tab 19$b$ is engaged with the slit 14$e_2$ to hold the holder 5. At the same time the protrusion 19$a$ ejects the disk 3 from the holder 5 by the pressure spring 21.

Next, a description will be given of the disk driver of the second embodiment according to the present invention with reference to FIGS. 12 to 20. The magnetic disk driver 40 of the embodiment differs from that of the first embodiment in the construction of the slider. The magnetic disk driver 40 comprises the frame 2, the front panel 30, the holder 5, and the slider 31. The element which are the same as corresponding elements in the first embodiment are designated by the same reference numerals, and a description thereof will be omitted.

The slider 31 of the embodiment comprises three members, such as a first guide member 31$a$, a second guide member 31$b$, and a connection member 31$c$. The guide members 31$a$ and 31$b$ are respectively located parallel to an insertion direction of the case 4 (AB direction) and slidably stand on the bottom plate 2$d$ of the frame 2. The guide members 31$a$ and 31$b$ respectively comprise inclined grooves 31$a_1$ and 31$b_1$ into which pins 5$f$ of the holder 5 are inserted. Though the slider 31 is located between the holder 5 and the frame 2 according to this embodiment, may be located on the holder 5 as in the first embodiment.

The eject button 17 is attached to the front end of the guide member 31$b$. As in the first embodiment, the eject button 17 is located at the extension part 30$a$ extending in a direction along the longest part of the insertion entrance 5$g$ so that the thickness H$_2$ of the front panel 30 is thinner than the thickness H$_1$ of the conventional front panel 120.

The guide members 31$a$ and 31$b$ are connected to the connection member 31$c$ at the engaging parts 31$a_2$ and 31$b_2$ thereof, respectively. The guide member 31$b$ further comprises a groove 31$b_3$ which is to be engaged with a latch lever 25, and engaging part 31$b_4$ which is engaged with an end of the tension spring 26. The tension spring 26 is engaged with a side plate of the frame 2 at an end thereof. Therefore, the guide member 31$b$ is forced in the direction B by the spring 26. Before the case 4 is inserted, the groove 31$b_3$ touches the tab 25$b$ of the latch lever 25 so that the guide member 31$b$ is shifted in the direction A.

The latch lever 25 is supported pivotably around an axis mounted on the frame 2 at an innermost part of the holder 5. The latch lever 25 comprises a protrusion 25$a$ which touches the inserted case 4, and a tab 25$b$ which is engaged with the groove 31$b_3$. Before inserting the case 4, the latch lever 25 is forced counterclockwise by a torsion spring 27, and the tab 25 is inserted into the groove 31$b_3$. On the other hand, the guide member 31$a$ comprises engaging portion 31$a_3$ which engages with one end of a torsion spring 28. The other end of the spring 28 is engaged with the side plate of the frame 2. Therefore, the guide member 31$a$ is forced in the direction A by the spring 28. Namely, the sliding direction of the guide members 31$a$ and 31$b$ is reversed, as is the sliding direction of the inclined grooves 31$a_1$ and the 31$b_1$.

The connection member 31$c$ mounted on the bottom plate 2$d$ of the frame 2 comprises attachment hole 31$c_1$ at the center thereof. A pin 29 screwed into an attachment portion 2$d_1$ of the bottom plate 2$d$ is inserted into the attachment hole 31$c_1$ so that the connection member 31$c$ can swing around the pin 29. The connection member 31$c$ further comprises a first arm 31$c_2$ and a second arm 31$c_3$. The arms 31$c_2$ and 31$c_3$ respectively have pins 31$c_4$ and 31$c_5$ at respective ends thereof. The pins 31$c_4$ and 31$c_5$ are engaged with the engaging parts 31$a_2$ and 31$b_2$, respectively.

The guide members 31$a$ and 31$b$ and connection member 31$c$ do not tend to deform because of their narrow plate shapes. Therefore, the slider 31 stably releases the holder 5 from being held. And the holder 5 can stably descend and/or ascend. In addition, if the holder 5 is deformed or the location of the pins 5$f$ is shifted, the guide members 31$a$ and 31$b$ compensate the error because of the simple connection between the guide members 31$a$ and 31$b$ and the connection member 31$c$ via the pins 31$c_4$ and 31$c_5$, respectively. The connection member 31$c$ needs a relatively small space to be disposed in because it connects the guide members 31$a$ and 31$b$ with each other. Therefore, another member can be accommodated in the space between the bottom plate 2$d$ and the holder 5.

Figure 18:
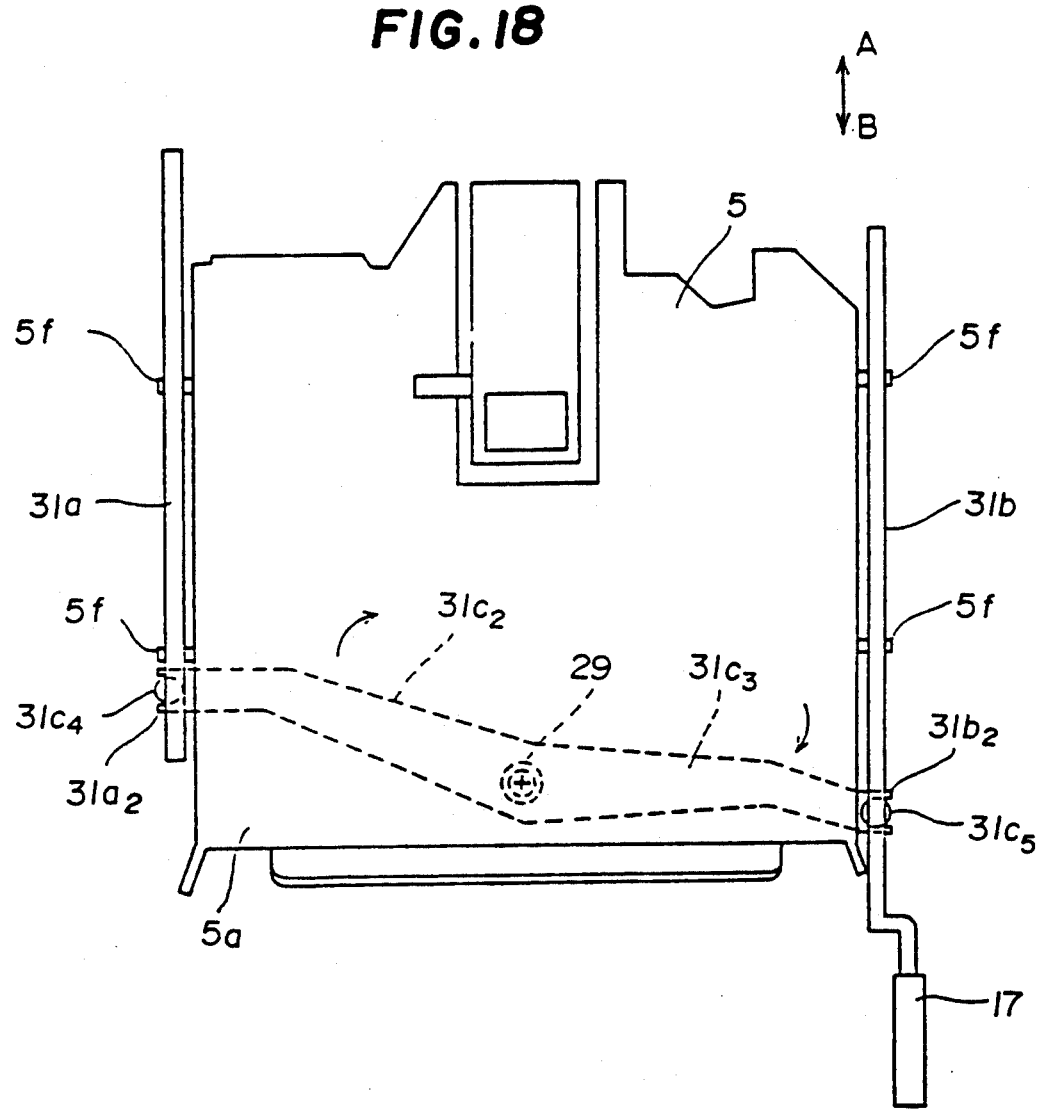
FIG. 18 is a view for explaining a loading operation of the disk.

A description will now be given of the magnetic disk driver 40 when loading the case 4 therein. Before inserting the case, the holder 5 is located at the insertion position indicated by the one dot line in FIG. 14, the first guide member 31a is shifted to the direction B, and the second guide member 31b is shifted to the direction A so as to be held by the latch lever 25. When the case 4 is inserted into the holder 5, the front end of the case 4 touches the protrusion 25a of the latch lever 25. If the case 4 is further inserted in the direction A, the latch lever 25 rotates clockwise so that the tab 25b deviates from the groove $31b_3$. Therefore, as shown in FIG. 18, the guide member 31b is slid in the direction B by the torsion spring 26. The connection member 31c rotates clockwise in response to the sliding in the direction B of the guide member 31b so that the guide member 31a rotates in the direction A. As a result, the holder 5 descends to the loading position, as shown by the solid line in FIG. 14, along the inclined grooves $31a_1$ and 31b via the pins 5f. When ejecting the case 4, the eject button 17 is pushed in the direction A. Thus, the guide member 31b slides in the direction A so that the connection member 31c rotates clockwise in order to slide the guide member 31a in the direction B. Therefore, the holder ascends to the insertion position along the inclined grooves $31a_1$ and $31b_1$. The guide member 31b is shifted to the direction A so as to be held by the latch lever 25. At the same time, the guide member 31a is shifted to the direction B via the connection member 31c. The case 4 is ejected in the direction B by the rotation of the latch lever 25.

Figure 19:
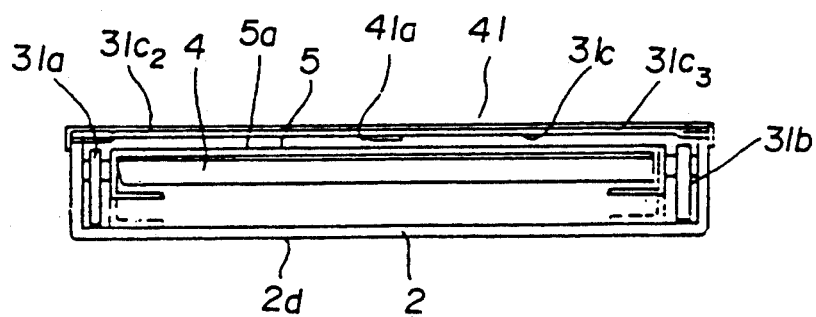
FIG. 19 and FIG. 20 are views showing different respective arrangements of the slider.
Figure 20:
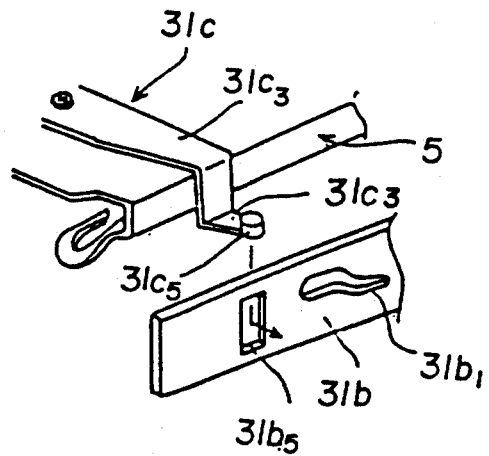

Since the insertion entrance 5g and the eject button 17 are not piled on the same plane, when the eject button 17 is pushed, a finger does not hit the ejected case 4 so that the eject operation can be more easily performed than in the case of the conventional one. Since the guide members 31a and 31b which are slidably standing are positioned by the holder 5 and the side plates of the frame 2, they stably slide. Incidentally, as shown in FIG. 19, the connection member 31c may be swingably supported around a shaft 41a mounted on an under surface of a cover 41 located at an upper end of the frame 2. The space between the holder 5 and the bottom plate 2d is not necessary because of omitting the attachment portion $2d_1$ is omitted from the bottom plate 2d so that the disk driver is made thinner. In addition, as shown in FIG. 20, the connection member 31c may be swingably attached to the crown plate 5a of the holder 5. The connection member 31c ascends with the holder 5 so that both ends of each of the arms $31c_1$ and $31c_2$ are bent to be inserted holes $31a_4$ and $31b_5$ mounted on the guide members 31a and 31b. Thus, the pins $31c_4$ and $31c_5$ are respectively connected with the guide members 31a and 31b, irrespective of the position of the holder 5.

The present invention is applicable to an optical disk driver and/or photomagnetic disk driver. The guide members 31a and 31b may be made of steel or synthetic resin. In addition, the sliding direction of the guide members can be reversed.

What is claimed is:

1. A disk driver comprising:
   a frame;
   a holder into which a disk is inserted from a first direction and from which the disk is ejected in a second direction opposite to the first direction, said holder being located at a first position when the disk is inserted or ejected and being located at a second position when information is recorded on the disk and/or reproduced therefrom, and said holder being mounted on said frame movably between the first and second positions in a state where the disk is accommodated in the holder;
   a holding member, mounted on said frame, for holding said holder at the second position when said holder is moved to the second position;
   a head for recording the information on one side of the disk and/or reproducing the information therefrom, said head being located at a third position to avoid contact with the disk when said holder is located at the first position and being located at a fourth position where said head can record the information on the disk and/or reproduce the information therefrom when said holder is located at the second position, and said head being mounted on said frame movably between the third and fourth positions;
   a slider, located above said holder at the first position, which is engaged with said holder and engagable with said holding member, said slider having a groove through which said head passes when said head moves between the third and fourth positions;
   an ejector, engaged with said slider, which is manipulated when ejecting the disk in order to push said slider approximately parallel to the first direction, said slider sliding approximately parallel to the first direction to release said holder from being held by said holding member when said ejector is manipulated in a state where said holder is located at the second position, said slider moving said holder from the first position to the second position in response to the disk being inserted into said holder, and said slider moving said holder from the second position to the first position in response to the releasing of said holder from being held;
   moving means for moving said head between the third and fourth positions, said moving means moving said head from the third position to the fourth position responsive to the moving of said holder from the first position to the second position and moving said head from the fourth position to the third position responsive to the moving of said holder from the second position to the first position; and
   an arm having a lower surface opposite to the disk and an upper surface opposite to the lower surface, said head being supported by said arm at the lower surface thereof and mounted on said frame via said arm, said slider being located under the upper surface of the arm.

2. A disk driver according to claim 1, wherein said moving means comprises a rigid member which links said head with said holder.

3. A disk driver according to claim 1, wherein said slider further comprises eject means for ejecting the disk from said holder when said holder moves from the first position to the second position.

4. A disk driver comprising:
   a frame;
   a holder into which a disk is inserted from a first direction and from which the disk is ejected in a second direction opposite to the first direction, said holder being located at a first position when the disk is inserted or ejected and being located at a second position when information is recorded on the disk and/or reproduced therefrom, and said holder being mounted on said frame movably between the first and second positions in a state where the disk is accommodated in the holder;

a holding member, mounted on said frame, for holding said holder at the second position when said holder is moved to the second position;

a first head for recording the information on one side of the disk and/or reproducing the information therefrom, said first head being located at a third position to avoid contact with the disk when said holder is located at the first position and being located at a fourth position where said first head can record the information on the disk and/or reproduce the information therefrom when said holder is located at the second position, said first head being mounted on said frame movably between the third and fourth positions, a second head for recording the information on another side of the disk and/or reproducing the information therefrom, said second head being mounted on said frame, said second head being located at a position where said second head can record the information on the disk and/or reproduce the information therefrom when said holder moves to the second position, said second head moving only in an approximately radial direction of the disk;

a slider located above said holder at the first position, which is engaged with said holder and engagable with said holding member;

an ejector, engaged with said slider, which is manipulated when ejecting the disk in order to push said slider approximately parallel to the first direction, said slider sliding approximately parallel to the first direction to release said holder from being held by said holding member when said ejector is manipulated in a state where said holder is located at the second position, said slider moving said holder from the first position to the second position in response to the disk being inserted into said holder, and said slider moving said holder from the second position to the first position in response to the releasing of said holder from being held;

moving means for moving said head between the third and fourth positions, said moving means moving said first head from the third position to the fourth position responsive to the moving of said holder from the first position to the second position and moving said first head from the fourth position to the third position responsive to the moving of said holder from the second position to the first positions; and an arm having a lower surface opposite to the disk and an upper surface opposite to the lower surface, said first head being supported by said arm at the lower surface thereof and mounted on said frame via said arm, said slider being located under the upper surface of the arm.

5. A disk driver according to claim 4, wherein the disk driver further comprises a spring which is engaged with said slider at one end thereof, and which at the other end thereof is fixed at said frame, said spring generating an elastic force in a direction approximately parallel to the second direction when said ejector is manipulated and said slider slides to the direction approximately parallel to the first direction, and said slider, when the ejector is released from being manipulated, being returned by the elastic force to an initial position where said slider is located before sliding.

6. A disk driver according to claim 5, wherein the disk is a magnetic disk, and said first and second heads are magnetic heads.

7. A disk driver comprising:

a frame;

a holder having an insertion entrance through which a disk is inserted therein from a first direction and from which the disk is ejected therefrom in a second direction opposite to the first direction, said holder being located at a first position when the disk is inserted or ejected and being located at a second position when information is recorded on the disk and/or reproduced therefrom, and said holder being mounted on said frame movably between the first and second positions in a state where the disk is accommodated in the holder;

a holding member, mounted on said frame, for holding said holder at the second position when said holder is moved to the second position;

a head for recording the information on one side of the disk and/or reproducing the information therefrom, said head being located at a third position to avoid contact with the disk when said holder is located at the first position and being located at a fourth position where said head can record the information on the disk and/or reproduce the information therefrom when said holder is located at the second position, and said head being mounted on said frame movably between the third and fourth positions;

a slider engaged with said holder and engagable with said holding member, said slider being located between said third and fourth positions of said head;

an ejector, engaged with said slider and located at an extension part extending in a direction along a longest part of the insertion entrance of said holder so that said ejector and said holder are not piled in a same plane, which is manipulated when ejecting the disk in order to push said slider approximately parallel to the first direction, said slider sliding approximately parallel to the first direction to release said holder from being held by said holding member when said ejector is manipulated in a state where said holder is located at the second position, said slider moving said holder from the first position to the second position in response to the disk being inserted into said holder, and said slider moving said holder from the second position to the first position in response to the releasing of the holder from being held;

moving means for moving said head between the third and fourth positions; and an arm having a lower surface opposite to the disk and an upper surface opposite to the lower surface, said head being supported by said arm at the lower surface thereof and mounted on said frame via said arm, said slider being located under the upper surface of the arm.

8. A disk driver according to claim 7, wherein said disk driver comprises a magnetic disk driver.

9. A disk driver according to claim 7, wherein said disk driver comprises an optical disk driver.

10. A disk driver according to claim 7, wherein said disk driver comprises a photomagnetic disk driver.

11. A disk driver comprising:

a frame;

a holder into which a disk is inserted from a first direction and from which the disk is ejected in a second direction opposite to the first direction, said holder being located at a first position when the disk is inserted or ejected and being located at a second position when information is recorded on the disk and/or reproduced therefrom, and said holder being mounted on said frame movably between the first and second positions in a state where the disk is accommodated in the holder;

a holding member, mounted on said frame, for holding said holder at the second position when said holder is moved to the second position;

a head for recording the information on one side of the disk and/or reproducing the information therefrom, said head being located at a third position to avoid contact with the disk when said holder is located at the first position and being located at a fourth position where said head can record the information on the disk and/or reproduce the information therefrom when said holder is located at the second position, and said head being mounted on said frame movably between the third and fourth positions;

a slider, engaged with said holder and engagable with said holding member, which comprises at least more than two members coupled mechanically;

an ejector, engaged with said slider, which is manipulated when ejecting the disk in order to push said slider approximately parallel to the first direction, said slider sliding approximately parallel to the first direction to release said holder from being held by said holding member when said ejector is manipulated in a state where said holder is located at the second position, said slider moving said holder from the first position to the second position in response to the disk being inserted into said holder, and said slider moving said holder from the second position to the first position in response to the releasing of said holder from being held;

moving means for moving said head between the third and fourth positions;

said slider comprising:

a first guide member which is engaged with a first side of said holder to guide and move the first side between the first position and the second position;

a second guide member which is engaged with a second side of said holder opposite to the first side thereof to guide and move the second side between the first position and the second position; and a connection member connecting the first guide member with the second guide member, said connection member being pivotably supported at a center point between the first and second guide members;

said ejector being engaged with the second guide member, the ejector when manipulated sliding the second guide member in the approximately first direction, and the first guide member sliding in the approximately second direction in response to the sliding of the second guide member via the connection member.

12. A disk driver according to claim 11, wherein said slider is located above said holder at the first position.

13. A disk driver according to claim 12, wherein said connection member is operatively interconnected to said holder.

14. A disk driver according to claim 11, wherein said holder has an insertion entrance through which a disk is inserted from the first direction and from which the disk is ejected in the second direction, the ejector being located at an extension portion in a direction along a longest part of the insertion entrance of said holder.

15. A disk driver according to claim 11, wherein the first and second guide members are made of steel.

16. A disk driver according claim 11, wherein said first and second guide member are made of synthetic resin.

17. A disk driver according to claim 11, wherein said disk driver comprises a magnetic disk driver.

18. A disk driver according to claim 11, wherein said disk driver comprises an optical disk driver.

19. A disk driver according to claim 11, wherein said disk driver comprises a photomagnetic disk driver.

* * * * *